Nov. 21, 1939.  G. MOCHAN  2,180,642
FOLDABLE TRUCK
Filed Nov. 17, 1938  2 Sheets-Sheet 1
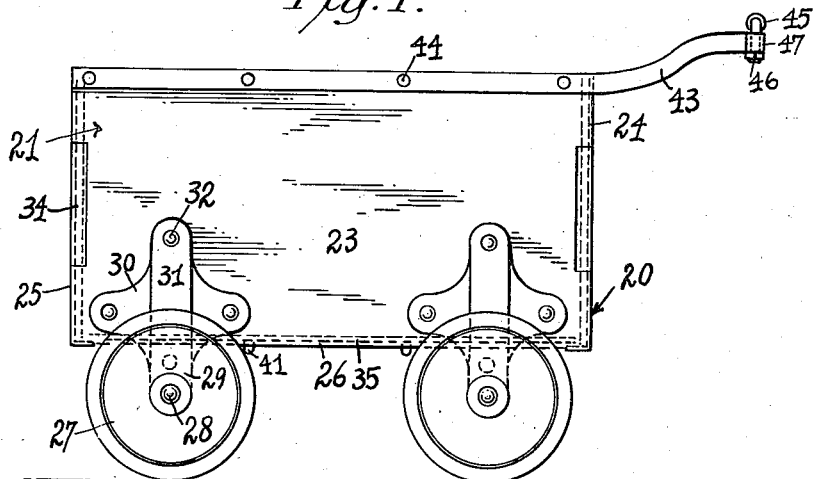
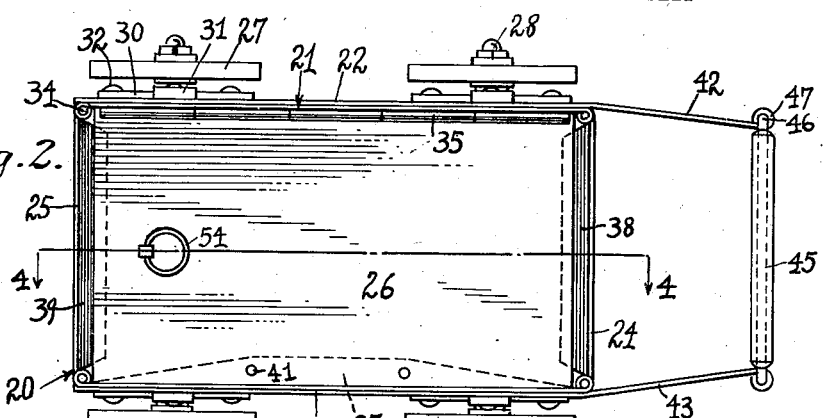
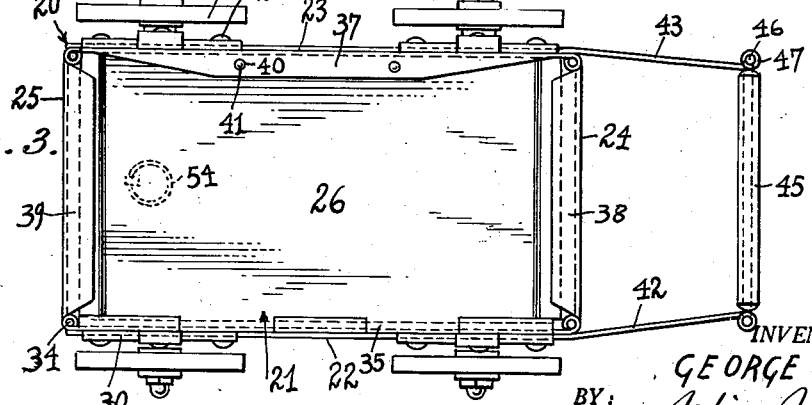
INVENTOR:
GEORGE MOCHAN,
BY: Julian J. Wittal
his ATTORNEYS.

Nov. 21, 1939.    G. MOCHAN    2,180,642
FOLDABLE TRUCK
Filed Nov. 17, 1938    2 Sheets-Sheet 2

INVENTOR:
GEORGE MOCHAN,
BY:
his ATTORNEYS.

Patented Nov. 21, 1939

2,180,642

UNITED STATES PATENT OFFICE 2,180,642

FOLDABLE TRUCK

George Mochan, New York, N. Y.

Application November 17, 1938, Serial No. 240,926

4 Claims. (Cl. 280—36)

This invention particularly relates to vehicles, and has for its main object to provide a vehicle which may be folded to a flat condition, when it is desired, as for instance, for shipping, storage, or for moving through narrow doors, corridors, passageways and which then may again easily be unfolded, opened into its normal position, and releasably secured in such position, when it is desired to proceed with the same in such normal position.

Another object of my invention is to provide a vehicle, as indicated, which will be movable on wheels, and in which the wheels may also fold into said flattened position, with the rest of the device.

My invention specifically relates to hand trucks which have a box-like upper structure, with side walls and a bottom, and another object thereof is to provide a device of this character in which the walls and the bottom may be folded into a flat position, generally along a plane, or unfolded and releasably secured in a normal box-like arrangement.

Still a further object of my invention is, to provide a vehicle, with a box-like upper structure, in which wheels are reliably secured on the walls of said upper structure and still are foldable with the same, into a flattened elongated position.

Still other objects of this invention will be apparent as the specification of the same proceeds, and, among others, I may mention: to provide a device of the type characterized which will be simple in construction, inexpensive to manufacture, reliable in operation, resisting to wear, easily folded on hinges between the parts, and as easily returned into its normal position and locked in such position or unlocked therefrom.

The principle of my invention may also be applied to other devices than vehicles, where the folding of a container into a flattened condition is desired with means to easily open the same into its normal operative position and reseasably lock it in such condition, as for instance, in the case of various boxes, laundry baskets, and the like.

In the drawings, forming a part of this specification, and accompanying the same:

Fig. 1 is a side elevation of a foldable truck constructed according to my invention;

Fig. 2 is plan view of the same, with its bottom folded down into operative position, while Fig. 3 is a bottom view thereof, in a similar position;

Figure 4:
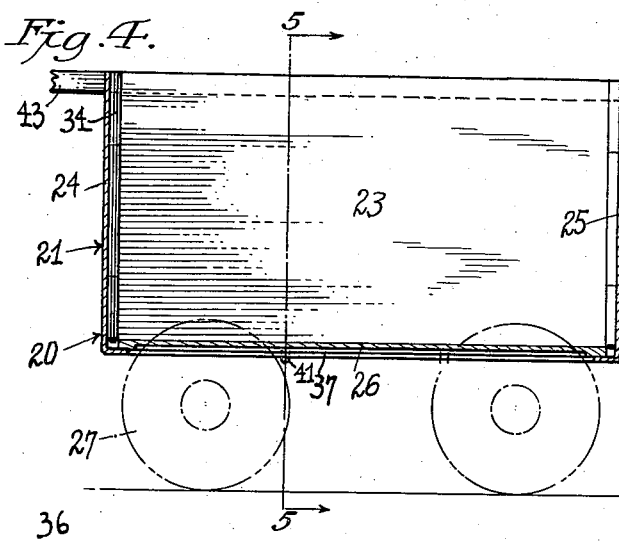
Fig. 4 is a sectional elevation, the section being taken on the line 4—4 of Fig. 2, and portions of the device having been removed, or being shown in an imaginary manner.

Referring now to the drawings more in detail, by characters of reference, the numeral 20 indicates my improved foldable truck in general, having a box-like upper structure, or body, generally indicated by the numeral 21, being composed of the two side walls, 22 and 23, a front end wall 24, a rear end wall 25, and a bottom 26.

When it is desired, a cover may also be provided, either in one piece and removable, or hinged along one edge thereof, or in sections, but preferably in two sections hinged on the two opposite side walls, 22 and 23. The drawings in this application, however, indicate a box-shaped body with an open top.

Four running wheels 27 are arranged on my truck, in the embodiment shown, but of course more or less thereof may be provided, in an appropriate manner, so as to permit the folding or unfolding of my device as will be understood.

The wheels 27 are secured on the front, and on the rear parts of the two side walls 22 and 23, respectively, and a stub shaft 28 is provided for every wheel, strongly secured in the downward extension 29 of a plate 30, partly of double thickness, as at 31, and secured on the respective side walls, as by the rivets 32. A wheel cap 33 is threaded and secured on the outer end of the stub shaft 28, to secure the wheel thereon but permitting its easy rotation.

A hinge structure 34 is arranged at each corner, between the respective pairs of side walls 22 and 23, and end walls 24 and 25, said hinge structure being any usual well-known type, understood by those versed in this art, and as indicated in the drawings. Said hinges are easily worked and it will be obvious that without a further support or lock, the four sides or walls of the device would collapse and could be folded flat upon one another, as indicated in Fig. 7.

Figure 5:
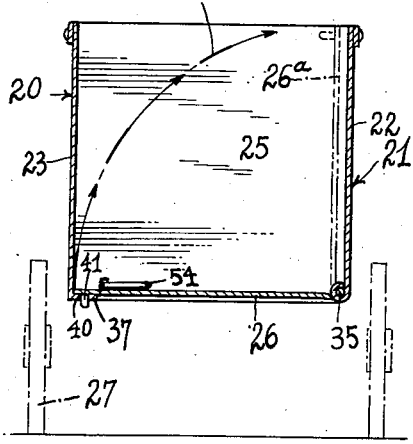
Fig. 5 is another sectional elevation on the line 5—5 of Fig. 4.
Figure 6:
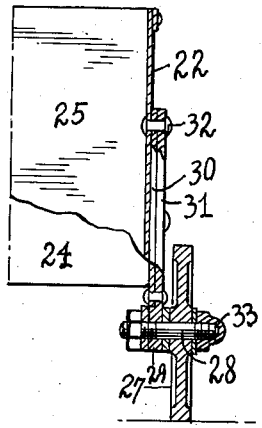
Fig. 6 is a sectional detail showing one form of applying the wheels to my device.
Figure 7:
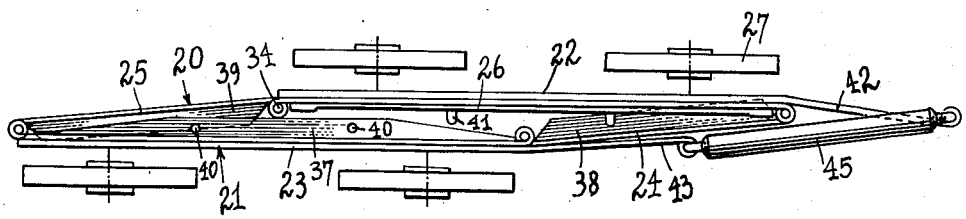
Fig. 7 is a partly diagrammatical plan view, showing my device in a folded, flattened position.

The bottom 26 is also hinged at the lower end of the side wall 22, as indicated at 35, so that it may be rocked or turned into a lower operative position, as indicated in Figs. 1 to 5, or turned upwardly, folded against side wall 22, as indicated by the arrows 36 in Fig. 5, and by the dot and dash imaginary position 26a thereof, in said figure, or by its upwardly folded illustration in Fig. 7. Side wall 23, and end walls 24 and 25, are provided with inwardly turned supporting flanges 37, 38 and 39, respectively, at their lower ends, and the bottom 26 may be supported on said flanges, when in a downwardly folded, operative position. The flange 37 may have two apertures or holes 40, into which may enter the pins 41 on the foldable bottom 26 so as to secure said bottom in its downwardly folded position, bottom 26 in this position also securing the side walls 22 and 23, and the end walls 24 and 25, in their operative rectangularly arranged normal position, shown in Figs. 1 to 5, as will be understood.

My device, in the embodiment shown, may have two forwardly projecting arms 42 and 43, secured along the upper ends of the side walls 22 and 23, respectively, as indicated at 44, and a push bar, or cross rod, 45 may be secured across the free ends of the arms 42 and 43 for pushing or pulling the truck during its operation, and said cross bar 45 may be terminated by two downwardly bent pins 46 rotatable in sleeves 47, at the ends of the bars 42, and 43, respectively, thereby providing pivoted connections between the push bar 45 and the arms 42 and 43.

The use and operation of my device is as follows: When it is desired to use my foldable truck, the bottom 26 will be folded down, resting on the flanges 37, 38 and 39, pins 41 entering the holes 40, in the flanges 37, and thereby forcing the four sides 22, 23, 24 and 25 into their normal rectangularly arranged position, thereby forming a box-like structure to be used for the transport of goods and materials; this position of my device being indicated in Figs. 1 to 5.

When my device is not used, the bottom 26 may be folded upwardly, along-side of the wall 22, as indicated by the dot and dash lines in Fig. 5, and by full lines in Fig. 7, after which the four sides thereof will be easily rocked on the respective hinges 34 using a slight pressure and force, in Fig. 7 the device is shown in its flattened, folded position, still being adapted to be propelled on the wheels 27. In this form, my folded truck may easily be taken to a place of storage, and there a number of them stored, either in a side by side position, or by being laid on the floor or ground on its flat side and one on top of the other. In this manner, the storage of the truck, while out of use, is made easy, convenient and requiring less room than was necessary for similar trucks, heretofore. The same advantages are evident in case of shipping such trucks.

It also is obvious that not only will the side and end walls rotate around the hinges 34 and thereby be folded into the materially narrowed and flat position of Fig. 7, but at such an operation the push bar 45 will also rock or turn on the pivots formed by the pins 46 and sleeves 47, permitting such a folding of the device, and said bar also being folded into the general plane of the flattened device, in the position indicated in Fig. 7.

Figure 9:
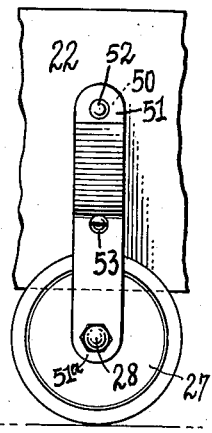
Figs. 8 and 9 are a partly sectional axial elevation, and a side elevation, respectively, of a modification of the arrangement of the wheels on my device.
Figure 8:
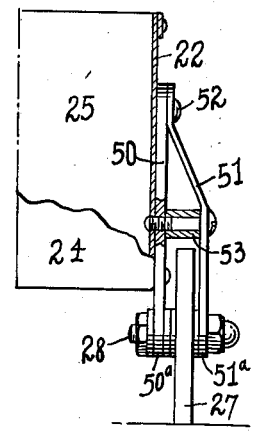

A modification of the wheel arrangement for my folding truck is indicated in Figs. 8 and 9. In this embodiment thereof a downward supporting bar 50 is secured on the respective side walls of my device, and a second, outwardly bent, bar 51 is secured thereover, by means indicated at 52; the lower ends 50a and 51a of the respective bars 50 and 51 being spaced apart from one another and the pin or shaft 28 carrying the wheel 27 being secured in said lower ends 50a and 51a. An appropriate spacing and reinforcing support 53 may be secured between the two bars 50 and 51, above the wheel 27.

To facilitate the upward rocking of the bottom 26, a foldable ring 54 or any other appropriate handle or catch device may be secured thereto.

It will be obvious, that I provided a novel truck or similar moveable vehicle which may be folded along a plane into a flattened condition, whereby many desirable novel uses and objects will be attained. It is well-known that one of the great drawbacks of the present hand trucks, as used in various establishments, like department stores, stores, storage places, post offices, railroads, etc., is that they are unyielding, rigid structures which it is awkward and inconvenient to store when out of use, or to ship from one place to another, and which often are unable to pass through a door, passageway, corridor, or other space between stored goods, etc., when such a space, corridor, door, etc. is too narrow for them. My foldable novel truck may be easily released and folded into a flattened condition, and stored and shipped in such a manner. Similarly it may be folded when it is desired to pass through a narrow passage, door, etc. and again opened up in the space or room where it is desired to use the same, after such passage. Indeed, in some cases, my truck may even be narrowed somewhat in a loaded condition and the load transported on the same through a narrow door or passageway.

What I claim as new, is:

1. In a foldable vehicle, a box-shaped upper structure, said upper structure having side walls and a bottom, each two adjacent side walls being pivoted to one another, and said bottom being pivoted on one of the side walls, a support on one of the other side walls for said bottom, releasable means on said bottom and on one of said walls, respectively, the engagement of said means securing said bottom and said side walls into their normal operative position, while the releasing thereof permitting the folding of said upper structure with the wheels thereon into a flat condition, substantially along one plane.

2. In a foldable vehicle, as set forth in claim 1, said supporting means for said bottom being in the form of a flange on one of said side walls, and said releasable means being in the form of pins on said bottom, and cooperating apertures in said flange.

3. In a foldable vehicle, having an upper structure, and wheels secured thereunder, pivoted connections between the members of the upper structure, whereby said upper structure, and the wheels thereon, may be folded into an elongated flat position, substantially along one plane, and an element adapted to releasably engage two of said members, said upper structure being adapted to be placed into said folded flat condition when said element is disengaged from one of said members, or be formed and locked into its normal operative position, when said element is engaging both said members, two arms secured on two opposite members in said upper structure, a crossbar for operating the vehicle, pivotedly secured to said two arms, whereby upon the folding of said upper structure, said arms and said crossbar may also be folded, substantially into said folding plane.

4. In a foldable container, having side walls and a bottom, each two adjacent side walls being pivoted to one another; and said bottom being pivoted on one of the side walls, a support on one of the other side walls for said bottom, releasable means on said bottom and on one of said walls, respectively, the engagement of said means securing said bottom and said side walls into their normal operative position, while the releasing thereof permitting the folding of said upper structure with the wheels thereon into a flat condition, substantially along one plane.

GEORGE MOCHAN.